United States Patent
Mendler

[11] Patent Number: 6,125,801
[45] Date of Patent: Oct. 3, 2000

[54] LEAN-BURN VARIABLE COMPRESSION RATIO ENGINE

[76] Inventor: Edward Charles Mendler, 3522 Northampton St., NW, Washington, D.C. 20015

[21] Appl. No.: 09/197,434

[22] Filed: Nov. 23, 1998

Related U.S. Application Data

[60] Provisional application No. 60/066,528, Nov. 25, 1997.

[51] Int. Cl.[7] .............................. F02B 75/04; F02B 47/08; F01L 1/34
[52] U.S. Cl. .................. 123/48 R; 123/78 R; 123/90.15; 123/568.14
[58] Field of Search .............................. 123/90.15, 90.16, 123/316, 568.14, 568.12, 78 R

[56] References Cited

U.S. PATENT DOCUMENTS

| | | | |
|---|---|---|---|
| 4,523,560 | 6/1985 | Motosugi et al. ...................... | 123/308 |
| 4,582,029 | 4/1986 | Masuda et al. ...................... | 123/90.16 |
| 4,633,403 | 12/1986 | Asmus ..................................... | 701/105 |
| 4,860,711 | 8/1989 | Morikawa .............................. | 123/48 D |
| 5,031,582 | 7/1991 | Kruger ................................... | 123/90.15 |
| 5,233,948 | 8/1993 | Boggs et al. ............................. | 123/64 |
| 5,450,824 | 9/1995 | Yamane et al. ...................... | 123/90.15 |
| 5,635,634 | 6/1997 | Reuschenbach et al. .............. | 73/118.2 |
| 5,775,283 | 7/1998 | Sawai et al. ...................... | 123/184.53 |
| 5,845,613 | 12/1998 | Yoshikawa ........................... | 123/90.15 |
| 5,878,714 | 3/1999 | Dai et al. ................................ | 123/316 |

*Primary Examiner*—Tony M. Argenbright
*Assistant Examiner*—Hai Huynh

[57] ABSTRACT

The efficiency of a spark-ignition internal-combustion engine having an adjustable fuel-to-air mixture ratio is improved significantly by reducing the fuel-to-air mixture ratio and increasing compression ratio. The increase in compression ratio and the reduction in fuel-to-air mixture ratio causes the engine to operate at higher efficiency and with lower air pollution levels, and without detrimental engine knock or misfire.

35 Claims, 4 Drawing Sheets

LEAN-BURN VARIABLE COMPRESSION RATIO ENGINE

PROVISIONAL APPLICATION REFERENCE

This application claims the benefit of U.S. Provisional Application Number 60/066,528 having a filing date of Nov. 25, 1997.

BACKGROUND OF THE INVENTION

The present invention relates to a method and apparatus for improving the efficiency of internal combustion engines, and more specifically to a method and apparatus for improving the efficiency of spark-ignition internal combustion engines having lean and/or diluted fuel-to-air mixture ratios.

It has been known for some time that the fuel efficiency of a spark-ignited (SI) internal-combustion engine can be improved by reducing the fuel-to-air mixture ratio from a stoichiometric value to a fuel lean value. SI engines having a fuel lean mixture are generally referred to as lean-burn engines. The fuel efficiency benefit of lean burn engines is well known, and described in *Internal Combustion Engine Fundamentals*, John B. Heywood, pg. 182, McGraw-Hill Book Company, 1988. It has also been known for some time that production of pollutants, including oxides of nitrogen (NOx), within the engine can be reduced by diluting the intake air with exhaust gas or employing significantly leaned fuel-to-air mixture ratios. The NOx reduction benefits of exhaust gas dilution and lean burn combustion are described in *Automotive Fuel Economy*, National Academy Press, pp. 217–219, 1992.

A problem with lean burn engines, however, is that of unstable combustion, partial burn, and misfire. More specifically, with increasing amounts of exhaust gas dilution and/or excess air, ignition quality deteriorates, and/or the mixture burns slowly and/or incompletely, resulting in high hydrocarbon (HC) emissions, significant variations in power output from cycle to cycle, and eventually misfire. The problem of poor combustion in lean burn engines is well known, and described in *Automobile Technology of the Future*, pp. 95–101, Society of Automotive Engineers, 1991. In port fuel injected prior art SI engines only a limited amount of mixture dilution can be employed without combustion quality becoming unacceptable. Consequently, the benefits of lean burn combustion and exhaust dilution are relatively small.

High levels of swirl within the combustion chamber can be used to achieve stable combustion of leaner fuel-to-air mixtures. However, the rapid swirling gas motion within the combustion chamber increases heat transfer and loss from the combustion charge, which substantially offsets the fuel economy benefit of lean burn combustion.

Significant research and development efforts are currently being directed towards spark-ignition direct-injection (SIDI) engines having ultra-lean-burn combustion. Mitsubishi Motor Corporation recently developed an SIDI engine that it now sells in Japan and Europe. The Mitsubishi SIDI engine is described in Society of Automotive Engineers (SAE) paper no. 970541, and in U.S. Pat. Nos. 5,740,777 and 5,806,482 issued to Hiromitsu Ando, General Manager of Engine Research Department at Mitsubishi et al. Mitsubishi claims that its SIDI engine has a low cost and a light load fuel economy improvement of 30% relative to conventional port fuel injection (PFI) engines. With SIDI engines, fuel is injected directly into the engine's cylinders to form a stratified charge having a rich or near stoichiometric mixture located near the spark plug at the moment of ignition. The rich or near stoichiometric mixture at the spark plug provide robust ignition and combustion of the fuel/air mixture within the cylinder. With SIDI and stratified charge, ultra-lean bulk-mixed fuel-to-air mixture ratios can be combusted yielding high fuel efficiency.

A problem with SIDI engines, however, is that with a stratified charge the fuel-to-air mixture ratio is rich or near stoichiometric at the spark plug, which results in high localized combustion temperatures and only marginal engine-out NOx reduction benefits. A much more sever problem with SIDI engines is that NOx in the exhaust gas can not be effectively reduced with known production-viable catalytic converters, and specifically when the SIDI engine is operating at a lean-burn high efficiency engine setting having free oxygen in the exhaust stream. Catalytic converter technology is evolving rapidly, however, if major developments in catalytic converter technology are not realized, SIDI engines may not be commercially viable in California and other states that phase in exceptionally stringent tail pipe emission standards.

Another approach that has been attempted for improving engine efficiency is variable compression ratio and adjustable valve control. Variable compression ratio systems with variable valve timing are described in U.S. Pat. No. 5,255,637 issued to M. M. Schechter, and in *Automobile Technology of the Future*, pp. 101–106, Society of Automotive Engineers, 1991. In prior art engines, variable compression ratio and variable valve control improves light load and part load engine efficiency, but provides only a minor improvement in peak engine efficiency. Variable valve control (also referred to as adjustable valve control) reduces light-load and part load pumping (e.g., throttling) losses, and variable compression ratio increases the light load and part load expansion ratio which improves engine efficiency. These engines have demonstrated a light load fuel economy improvement of approximately 12 to 15%. This is a small increase in fuel economy relative to the increased cost of the engine. A problem with variable compression ratio engines is that of high heat loss from the combustion chamber due to the relatively high chamber surface area to volume ratio, and poor combustion chamber shape. The problem of high heat loss is most sever in engines having high swirl levels and having a large valve overlap and subsequently large valve pockets in the pistons, which significantly increase combustion chamber surface area and heat loss. Additional improvements in light-load engine efficiency can theoretically be achieved by significantly reducing the displacement of the variable compression ratio engine, and employing supercharging to achieve maximum power requirements, however significant improvements in fuel economy have not been demonstrated with actual hardware, and these improvements do not improve peak engine efficiency. With respect to peak engine efficiency, prior art engines having variable compression ratio and variable valve control do not have significantly higher peak engine efficiency than conventional engines having a fixed compression ratio.

SUMMARY OF THE INVENTION

By the present invention, a fuel-to-air mixture ratio much leaner than that of prior art port fuel injected SI engines is employed to achieve high efficiency and low NOx emission levels. Variable compression ratio is then used to raise the engine's compression ratio and provide robust and rapid combustion. The fuel-to-air mixture is well mixed and not stratified in order to minimize combustion hot spots and formation of NOx. According to the present invention, variable compression ratio increases the preignition cylinder gas density, temperatures and pressures, which significantly improves ignition and early flame kernel development of the highly lean fuel-to-air mixture. The present invention provides stable combustion of stoichiometric fuel-to-air mixtures that have high levels of exhaust gas dilution, resulting in high fuel efficiency and exceptionally low NOx emissions.

FIG. 1 illustrates specifications of the present invention. Compression ratio Cr is shown on the vertical axis, and fuel-to-air mixture equivalence ratio ø is shown on the lower horizontal axis. Line 2 indicates the knock limit or compression detonation limit CDL of an engine according to the present invention operating on pump gasoline. Above line 2 the engine will knock, and below line 2 the engine will not knock. Line 4 indicates the lean mixture limit of the engine. To the left of line 4 combustion is generally unstable and incomplete. To the right of line 4 combustion is generally stable and complete. Point 6 indicates the theoretical engine settings anticipated to provide best brake specific fuel consumption for engines operating on a fuel having an octane high enough to avoid knock at this setting. While this setting may provide optimum efficiency, it is generally not attainable with gasoline (and other commercially and readily available fuels) because the compression ratio is above the knock limit of the engine indicated by line 2. The best engine efficiency occurring without detrimental engine knock will occur approximately at the closest proximity to the theoretical maximum efficiency point, which is anticipated to be at or near point 6, but below the knock limit of the engine indicated by line 2. In contrast, current production engines operate generally within a portion of Zone 1.

According to the present invention, the engine's compression ratio Cr s increased and the engine's equivalence ratio ø is reduced to attain high engine efficiency, low engine-out NOx emission levels, no detrimental engine knock, and stable and complete combustion. As one example of the present invention, the compression ratio and fuel-to-air ratio of the engine is adjusted by the engine's controller from a setting within Zone 1 to a setting near point 6 that is above the lean flammability limit line 4 and below the knock limit line 2 of the engine. Stable combustion of lean fuel-to-air mixture ratios is attained by increasing the engine's compression ratio and maximum combustion charge density. Knock is avoided by reducing the equivalence ratio. High efficiency is attained by both increasing the compression ratio and reducing the equivalence ratio. Low NOx emission levels are attained by employing a well mixed fuel-to-air mixture having significant air and/or exhaust gas dilution. More specifically, according to the present invention, fuel efficiency is improved by increasing the compression ratio Cr from a first ratio to a second ratio to provide a second maximum combustion charge density $\rho_2$ greater than the first maximum combustion charge density $\rho_1$, and reducing the fuel-to-air mixture equivalence ratio ø from a first ratio to a second ratio to provide a brake mean effective pressure bmep less than 750 kPa, whereby increasing the compression ratio Cr from the first ratio to the second ratio provides high efficiency and robust combustion, and reducing the fuel-to-air mixture equivalence ratio ø from the first ratio to the second ratio prevents detrimental engine knock and increases engine efficiency.

According to the present invention, valve overlap is minimized at high compression ratio levels. The reduced valve overlap at high compression ratio levels enables the size and surface area of the valve pockets in the piston to be minimized, causing heat loss from the combustion charge to be reduced, providing higher engine efficiency. The engine according to the present invention preferably includes adjustable valve control. According to the present invention, the adjustable valve control provides a smaller valve overlap at high compression ratio levels than at lower compression ratio levels, in order to minimize the size of the valve pockets in the piston, and improve engine efficiency. According to the present invention, at lower compression ratio values, the valve overlap period is increased to increase engine power. Preferably, a valve overlap of less than 25° is employed at maximum compression ratio, and a swirl ratio of less than 1.4 is used to minimize heat loss from the combustion charge to achieve a high peak efficiency.

The present invention can attain, or almost attain, the peak efficiency of diesel engines used in passenger cars, while also attaining about 90% lower NOx and particulate mater (PM) air pollution levels than the diesel engine. Specifically, the present invention, employed in a passenger car having a curb weight of less than 6500 pounds, can attain a peak efficiency of over 38%, NOx emission levels below 0.05 grams per mile (current passenger car diesel engines have NOx emissions slightly lower than 1.00 grams per mile), and PM emissions lower than 0.01 grams per mile.

The engine according to the present invention has a first engine setting having a first compression ratio position and a first equivalence ratio, where the first compression ratio position is below the knock limit of the engine at the first engine setting. The present invention has the steps of, increasing the compression ratio of the engine from the first position to a second position, and reducing the equivalence ratio ø from the first ratio to a second ratio, whereby reducing the equivalence ratio ø from the first ratio to the second ratio prevents detrimental engine knock, improves efficiency, and reduces NOx formation levels, and increasing compression ratio Cr from the first position to the second position prevents engine misfire and improves engine efficiency.

DETAILED DESCRIPTION OF THE PREFERRED EMBODIMENTS

Figure 2:
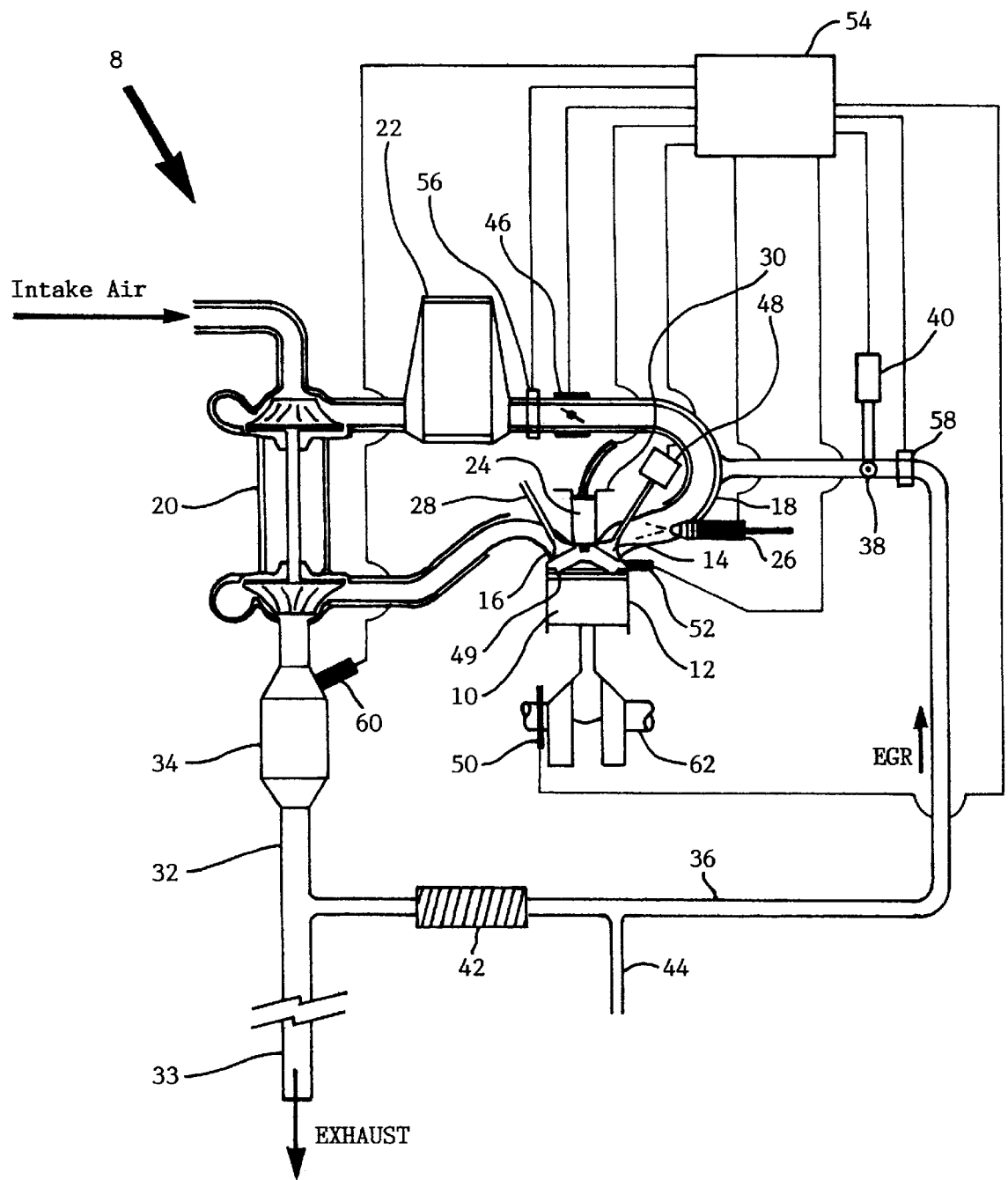
FIG. 2 shows schematically a portion of an engine according to the present invention.

FIG. 2 shows schematically the preferred embodiment of the present invention, and more specifically an engine 8 according to the present invention. In the preferred embodiment of the present invention, a piston 10 is slidably housed within a cylinder 12 which is provided with a fuel-to-air mixture $(F/A)_a$ via an intake valve 14, which is housed in a cylinder head 16, having an intake manifold 18, it being understood that engine 8 may include one or more pistons. Engine 8 may be equipped with a turbocharger 20 or other supercharging means, an optional intercooler 22, one or more spark plugs 24 per cylinder, one or more fuel injectors 26, one or more exhaust valves 28, and a compression ratio adjustment mechanism 30 to vary the combustion chamber volume and the compression ratio of engine 8. Those skilled in the art will appreciate that the system according to the present invention can be used with other types of variable compression ratio mechanisms. Engine 8 has an exhaust line 32 that receives exhaust gas from valve 28 and cylinder 12, and releases exhaust gas to the atmosphere at its downstream end through a tailpipe 33. Exhaust line 32 may include a catalytic converter 34 or another type of emission reduction device for reducing "engine out" emissions released from valve 28. Engine 8 may include exhaust gas recirculation (EGR) and an EGR feed line 36 for supplying EGR to intake valve 14. More specifically, EGR feed line 36 is attached to and in fluid communication with exhaust line 32 at its upstream end, and manifold 18, cylinder head 16, or another part of the intake air feed line of engine 8 at its downstream end. EGR feed line 36 may be attached to the intake air feed line of engine 8 either upstream or down stream of the supercharger, intercooler and/or throttle. Engine 8 may include an EGR valve 38 for controlling the flow rate of EGR into intake valve 14. EGR valve 38 may be actuated by low manifold pressure ("manifold vacuum") or by other means such as an electrical actuator 40. EGR feed line 36 may be attached to exhaust line 32 upstream or downstream of optional turbocharger 20, and EGR feed line 36 may include an exhaust gas cooler 42, a drain 44 for draining of condensed water, and an emission control device (not shown). Air flow into engine 8 can be controlled by a throttle plate 46 or other arrangement. The intake valve 14 may include an adjustable actuation and/or timing mechanism 48 for controlling air flow into the cylinder 12. Engine 8 can be used with one or more intake valves per cylinder. Engine 8 may have one or more valve adjustment mechanisms 48 to provide the same or different adjustment settings for each intake valve, for example valve adjustment mechanism 48 may provide different intake valve adjustment settings for each valve in cylinder 12 and/or mechanism 48 may provide different intake valve adjustment settings between cylinders for engines having multiple cylinders. The system according to the present invention can be used with a waste gate and with one or more turbochargers or other type of supercharger, such as a Lysholm supercharger or a Roots blower supercharger. Engine 8 may include a misfire sensor 50, and one or more knock sensor 52. Engine 8 includes a controller, CPU, EEC or ECU 54 for controlling the compression ratio and fuel-to-air mixture ratio of engine 8, as well as other engine variables. For example, controller 54 may be connected to and control EGR actuator 40 and EGR valve 38, valve adjustment mechanism 48, spark timing 24, turbo or supercharger 20, and/or other engine variables. Controller 54 may receive input signals from an intake air flow meter 56, an optional EGR flow meter 58, misfire sensor 50, knock sensor 52, one or more emission control system sensors 60, as well as other sensors such as an engine cooling water temperature sensor (not shown). Controller 54 may include an optimizer for optimizing the compression ratio, fuel-to-air mixture ratio, EGR flow rate, and/or other engine settings of engine 8 to provide optimum engine efficiency and minimum pollution levels while preventing detrimental engine knock, poor combustion and/or engine misfire. Engine 8 may be equipped with a fuel injector that injects the fuel directly into the cylinder 12 such as a gasoline direct injection (GDI) or a spark-ignition direct injection (SIDI) system (not shown). The geometric cylinder displacement D of engine 8 is equal to the product of the full stroke of piston 10 in cylinder bore 12 times the cross-sectional area of cylinder bore 12 times the number of pistons in engine 8. Engine 8 has a range of compression ratios Cr and a range of combustion chamber volumes d. Variable compression ratio mechanism 30 adjusts compression ratio Cr and combustion chamber volume d. Those skilled in the art will appreciate that engine 8 can have different size pistons and cylinders, and that the displacement, volumes and compression ratios of engine 8 can be calculated individually for each firing cylinder. A combustion charge is trapped within cylinder 12, that consists of air, a burned gas fraction, and fuel. The combustion charge trapped within cylinder 12 has a density ρ. The maximum density of the combustion charge within cylinder 12 is measured when piston 10 is at top-dead-center (TDC) within cylinder 12. The maximum combustion charge density within cylinder 12 varies from one engine setting to the next, and is dependent on the mass of gas and fuel trapped in cylinder 12, the compression ratio of the engine, and other factors such as the timing of intake valve closing. Piston 10 may have valve pockets 49. Preferably, the size of valve pockets 49 are at a minimum in order to minimize combustion chamber surface area and heat loss. The piston 10 is connected to a crankshaft 62 in a conventional manner or by another functional arrangement. Engine 8 may be employed to power a vehicle, such as a passenger car or truck, or to provide power for another applications.

Figure 1:
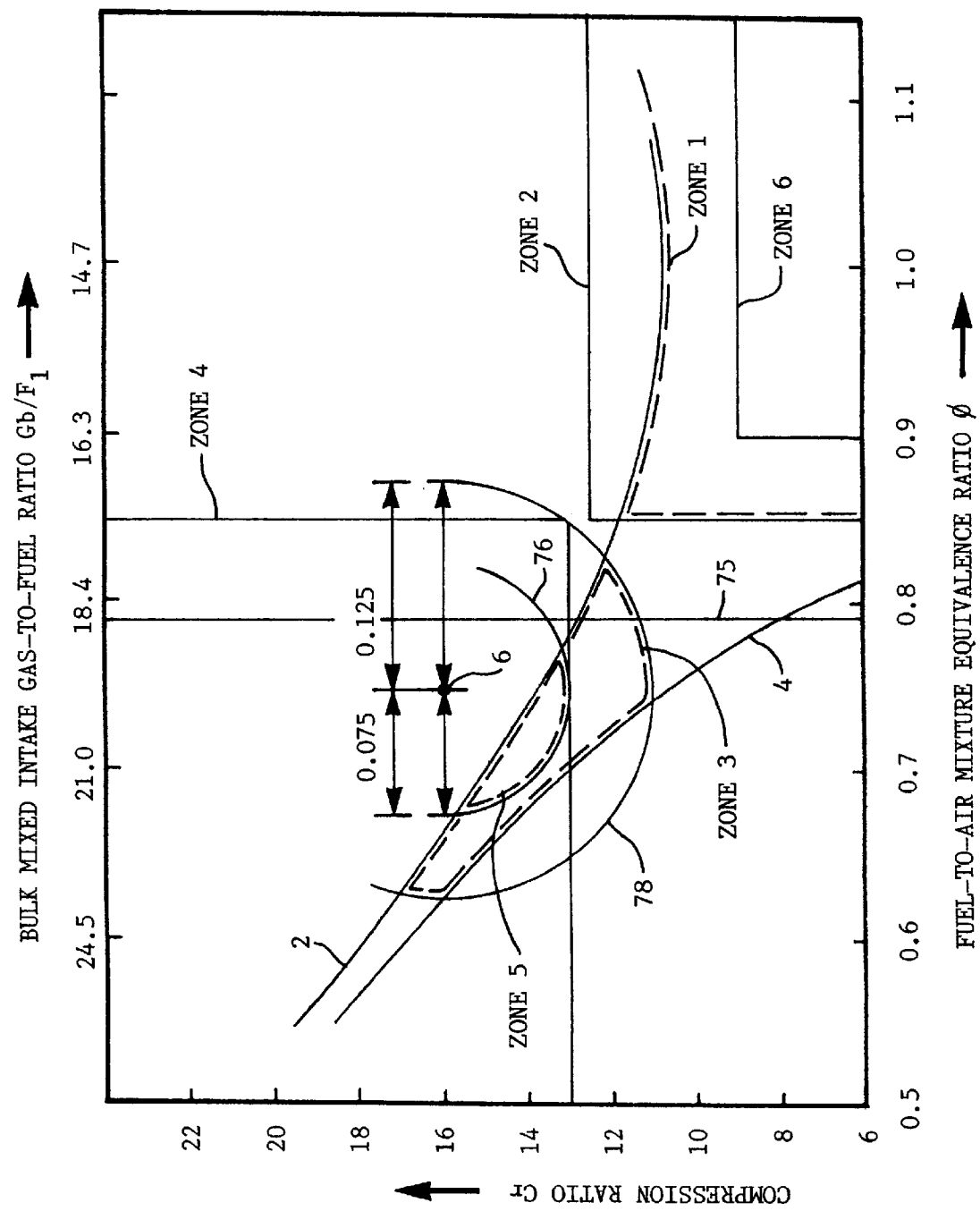
FIG. 1, already described, is a diagram showing compression ratio and fuel-to-air equivalence ratio zones of operation according to the present invention.
Figure 3:
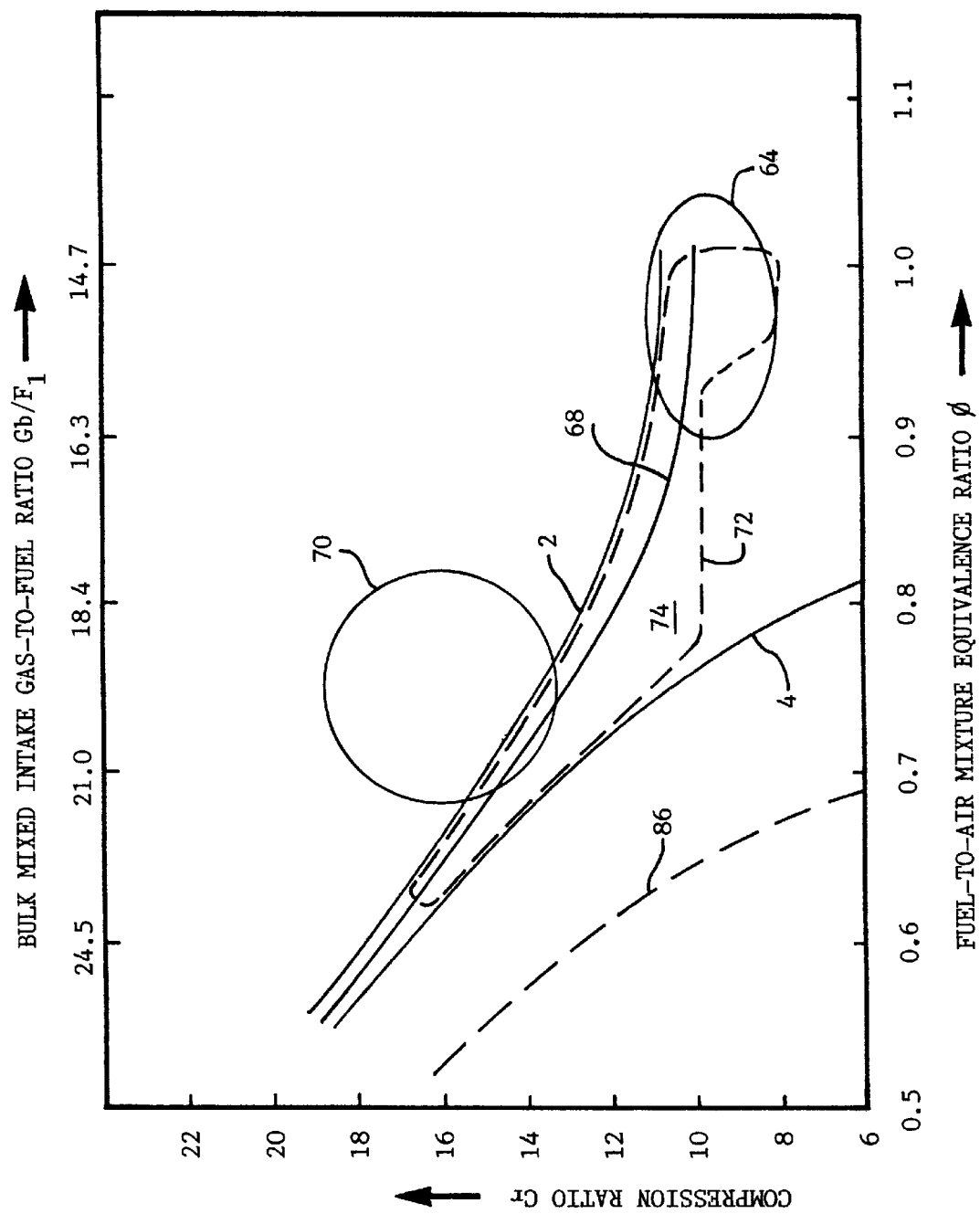
FIG. 3 is similar to FIG. 1, and shows the scope of the present invention.

FIG. 3 is similar to FIG. 1, and illustrates the operational range of the present invention. Compression ratio Cr is shown on the vertical axis, and fuel-to-air mixture equivalence ratio ø is shown on the lower horizontal axis. Referring to FIGS. 1 and 3, the compression ratio scale shown on the vertical axis indicates the mechanical swept volume compression ratio of the engine, where the compression ratio Cr of engine 8 equals, $$Cr=(D+d)/d=((S\pi B^2/4)+d)/d$$

where d is the combustion chamber volume of cylinder 12 times the number of cylinders in engine 8, and more specifically d is the minimum trapped volume within the cylinder(s) for a given Cr value. S is the full stroke of piston 10 within cylinder 12, and B is the bore of cylinder 12. Referring now to the lower horizontal axis of FIGS. 1 and 3, the actual fuel-to-air mixture ratio of engine 8, $(F/A)_a$, is defined as the fuel mass flow ($m_f$) into the engine's cylinder (s) divided by the air mass flow ($m_a$) into the engine's cylinder(s), where $$(F/A)_a = m_f/m_a$$

A stoichiometric, or chemically correct fuel-to-air mixture ratio, $(F/A)_s$ is where there is just enough air present to burn all of the fuel. The equivalence ratio ø shown on the lower horizontal axis in FIGS. 1 and 3 is equal to the actual fuel-to-air mixture ratio of the engine $(F/A)_a$, divided by the stoichiometric fuel-to-air mixture ratio $(F/A)_s$, where, $$ø=(F/A)_a/(F/A)_s$$

Equivalence ratios less than 1.0 (ø<1) are fuel lean and have more air than is needed to burn all of the fuel. The definition of equivalence ratio ø is provided in *Internal Combustion Engine Fundamentals*, John B. Heywood, McGraw-Hill Book Company, 1988 (see pages 53, 71, and 72, and FIG. 5–9, page 182).

Oval 64 indicates the general range of typical compression ratios and equivalence ratios of current production engines, it being understood that some prior art engines may operate outside of oval 64, such as Honda Motor Company's VTech-E lean-burn engine described in Automotive News, pg. 6, Sep. 2, 1991. Line 2 indicates the knock limit or compression detonation limit CDL of engine 8 at or near (e.g., within ±10° of crankshaft rotation) minimum spark advance timing for best torque MBT. The exact location of line 2 varies from one engine to the next. Line 2 slopes upward from equivalence ratios of about 1.0 shown at the right side of FIG. 3, to lean equivalence ratios shown on the left side of FIG. 3. The engine's ability to operate at high compression ratios without knock when operating on lean equivalence ratios is due in part to the reduced pressure and temperature rise of the end gas, where the end gas is the portion of the fuel/air mixture in the combustion chamber consumed last by the combustion flame front. Compression ratios above line 2 will generally cause the engine to knock. The location of line 2 depends on several factors, such as compression ratio, equivalence ratio, and on the mass and temperature of air inducted into cylinder 12, that is controlled by throttle 46 and/or valve adjustment mechanism 48. Spark timing can be adjusted away from MBT to raise line 2 and extend the knock limit of engine 8, however, this significantly degrades engine efficiency. Production engines have a "production knock limit," indicated by line 68, that is generally lower than the actual knock limit CDL indicated by line 2 under most driving conditions. The production knock limit is lower than the actual knock limit in order to provide a manufacturing factor of safety tolerance and to allow for deposit adhesion on the combustion chamber walls, and to avoid knock during off-design periods of engine operation, for example when the engine is overheated and during sudden increases in engine load (that may change the octane level of the fuel within the cylinder in port fuel injected engines caused by the non uniform evaporation characteristics of gasoline).

As a point of detail, line 2 indicates the knock limit of the engine below which there is no detrimental engine knock under almost all operational conditions of engine 8. Maximum engine efficiency can occur with incipient knock that is too small to cause damage to the engine or cause annoying engine noise. Line 2 indicates the range of compression ratios below which engine knock, if any, does not cause damage to the engine or cause substantive and/or annoying engine noise.

Line 4 indicates the lean mixture limit of the engine. To the left of line 4 combustion is generally unstable and incomplete. To the right of line 4 combustion is generally stable and complete. The exact location of line 4 varies from one engine to the next, and from one load and engine speed setting to the next. Unstable combustion has a cycle-to-cycle variation in brake mean effective pressure (bmep), or coefficient of variation COV, that exceeds 8%.

According to the present invention, the engine's compression ratio Cr is increased and the engine's equivalence ratio ø is reduced to attain high engine efficiency, low engine-out NOx emission levels, no detrimental engine knock, and stable and complete combustion. Specifically, the compression ratio and fuel-to-air ratio of the engine is adjusted by the engine's controller to a setting that provide high efficiency and low engine out NOx emission levels and in more detail that are above the lean flammability limit 4 and below the knock limit 2 of engine 8. Stable combustion of lean fuel-to-air mixture ratios is attained by increasing the engine's compression ratio. Preferably, use of swirl is minimized in order to minimize heat loss to the combustion chamber. The present invention provides high efficiency firstly due to increased compression ratio and a lean fuel-to-air mixture ratio, and secondly due to lower heat loss from the combustion chamber than engines having high levels of swirl.

Referring now to FIGS. 1, and 3, circle 70 indicates the general range of compression ratios Cr and equivalence ratios ø that provide best engine brake specific fuel consumption. Many of the settings within circle 70 are above line 2 and are not practical to attain due to engine knock. The actual location of circle 70 varies from engine to engine. In general, increasing the compression ratio above values shown in circle 70 causes excessive heat loss and greater piston ring and bearing friction losses. Reducing the equivalence mixture ratio to values to the left of those shown in circle 70 reduces the power output of the combustion charge, which reduces engine efficiency. Additionally, reducing the compression ratio Cr and/or increasing the equivalence ratio ø from the values shown within circle 70 lowers indicated thermodynamic efficiency. Consequently, the area within circle 70 indicates generally the range of equivalence ratios ø and compression ratios Cr that provide highest engine efficiency, it being understood that only a portion of the area within circle 70 is below knock limit line 2.

Dashed line 72 indicates the general range of operation of the present invention. The area within line 72, area 74, falls below line 2 and above and to the right of line 4. It is important to note that the locations of lines 2 and 4 vary with engine load and rotational speed (RPM), and from engine to engine.

According to the present invention, variable compression ratio mechanism 30 adjusts the compression ratio of engine 8 to, or approximately to, the actual knock limit of engine 8 indicated by line 2, which improves engine efficiency. If knock is detected, by knock sensor 52 or by other means, and/or if knock is predicted by controller 54, variable compression ratio mechanism 30 reduces the compression ratio Cr of engine 8 to terminate or avoid engine knock. According to the present invention, the efficiency of engine 8 is improved, and detrimental engine knock is prevented by reducing equivalence ratio ø and increasing compression ratio Cr.

Referring now to FIG. 1, point 6 has a compression ratio of 16:1 and a equivalence ratio ø of 0.75. FIG. 1 is similar to FIG. 3, except that FIG. 1 shows zones of operation according to the present invention. Point 6 indicates the theoretical engine settings anticipated to provide best brake specific fuel consumption for engines operating on a fuel having an octane high enough to avoid knock at this setting. While this setting may provide optimum efficiency, it is generally not attainable with gasoline (and other commercially and readily available fuels) because the compression ratio is above the knock limit of the engine indicated by line 2. The best engine efficiency occurring without detrimental engine knock will occur approximately at the closest proximity to the theoretical maximum efficiency point, which is anticipated to be at or near point 6, but below the knock limit of the engine indicated by line 2. Line 76 indicates a radius of 0.075 index units from point 6. With the chart scale shown in FIG. 1, 0.075 index units is equal in length to a change in equivalence ratio ø of 0.075 (as shown on the horizontal axis), and 0.075 index units is equal in length to a change in compression ratio of 3. The best engine efficiency occurring without detrimental engine knock generally occurs within Zone 5, which is bound by line 76 and line 2. Zone 5 may also be bound by line 4, and specifically for engines where line 4 intersects line 76 (not shown). Line 78 indicates a radius of 0.125 index units from point 6. Zone 3 is bound by lines 78, 2, and 4. Zone 3 includes a broader range of engine settings, that provide engine efficiencies almost as high as the efficiency levels attainable with the engine settings that fall within Zone 5, and that requires less precise and/or less frequent adjustment of the engine's compression ratio setting during typical driving conditions. It is important to note that compression ratio and equivalence ratio settings that provide best efficiency vary from one engine to the next, and point 6 is intended to indicate the engine settings anticipated to provide best efficiency for most engines according to the present invention.

Referring to FIG. 1, the present invention has the following zones of operation;

Zone 1, having a compression ratio less than the knock limit of the engine indicated by line 2, and an equivalence ratio ø greater than 0.85;

Zone 2, having a compression ratio less than 12.5:1, and an equivalence ratio ø greater than 0.85;

Zone 3, having a compression ratio less than the knock limit of the engine indicated by line 2, and having an equivalence ratio ø greater than the lean mixture limit indicated by line 4, and within a radius of 0.125 index units from a compression ratio of 16:1 and an equivalence ratio ø of 0.75 indicated by point 6;

Zone 4, having a compression ratio greater than 13:1, and an equivalence ratio ø less than 0.85;

Zone 5, having a compression ratio less than the knock limit of the engine indicated by line 2, and having an equivalence ratio ø greater than the lean mixture limit indicated by line 4, and within a radius of 0.075 index units from a compression ratio of 16:1 and an equivalence ratio ø of 0.75 indicated by point 6;

Zone 6, having a compression ratio less than 9:1, and an equivalence ratio ø greater than 0.90.

According to the present invention, engine efficiency is increased by increasing compression ratio and reducing equivalence ratio ø from;

values within Zone 1 to values within Zone 3; or
values within Zone 1 to values within Zone 4; or
values within Zone 1 to values within Zone 5; or
values within Zone 2 to values within Zone 3; or
values within Zone 2 to values within Zone 4; or
values within Zone 2 to values within Zone 5; or
values within Zone 6 to values within Zone 3; or
values within Zone 6 to values within Zone 4; or
values within Zone 6 to values within Zone 5; or
any setting outside of Zone 3 to any setting within Zone 5; or
any setting outside of Zone 3 to any setting within Zone 3; or
any setting outside of Zone 5 to any setting within Zone 5.

Referring now to FIG. 1 and FIG. 3, according to the preferred embodiment of the present invention, the compression ratio and equivalence ratio ø are adjusted so that the engine operates generally within area 74 bound by dashed line 72, in order to avoid engine knock, attain stable and complete combustion, attain a fast burn rate and attain high efficiency. Engine 8 has a first engine setting having a first compression ratio position and a first equivalence ratio, where the first compression ratio position is below the knock limit of the engine at the first engine setting. According to the present invention, engine 8 has the steps of, increasing the compression ratio from the first position to a second position, and reducing the equivalence ratio ø from the first ratio to a second ratio, whereby reducing the equivalence ratio ø from the first ratio to the second ratio prevents detrimental engine knock, and increasing compression ratio Cr from the first position to the second position improves efficiency.

According to the present invention, engine 8 has a first engine setting having a first compression ratio position and a first equivalence ratio, where the first equivalence ratio is greater than the lean flammability limit of the engine at the first engine setting. According to the present invention, engine 8 has the steps of reducing the equivalence ratio ø from the first ratio to a second ratio, and increasing the compression ratio from the first position to a second position, whereby reducing equivalence ratio from the first ratio to the second ratio improves efficiency, and increasing the compression ratio from the first compression ratio position to the second compression ratio position improves engine efficiency, and combustion stability, completeness and speed.

As one example of the present invention, the first position may be located within Zone 1, and the second position may be located within Zone 5. The first and second positions may be located in other zones, such as Zone 6 and Zone 3 respectively.

Similarly, according to the present invention, the method of improving the fuel efficiency of spark-ignition internal-combustion engines having variable compression ration, a first compression ratio position less than 12.5:1 and a first equivalence ratio ø greater than 0.85:1, has the steps of, increasing the compression ratio to a position greater than 13:1, and reducing the equivalence ratio ø to a ratio less than 0.85:1, whereby increasing the compression ratio and reducing the equivalence ratio ø increases engine efficiency.

Figure 4:
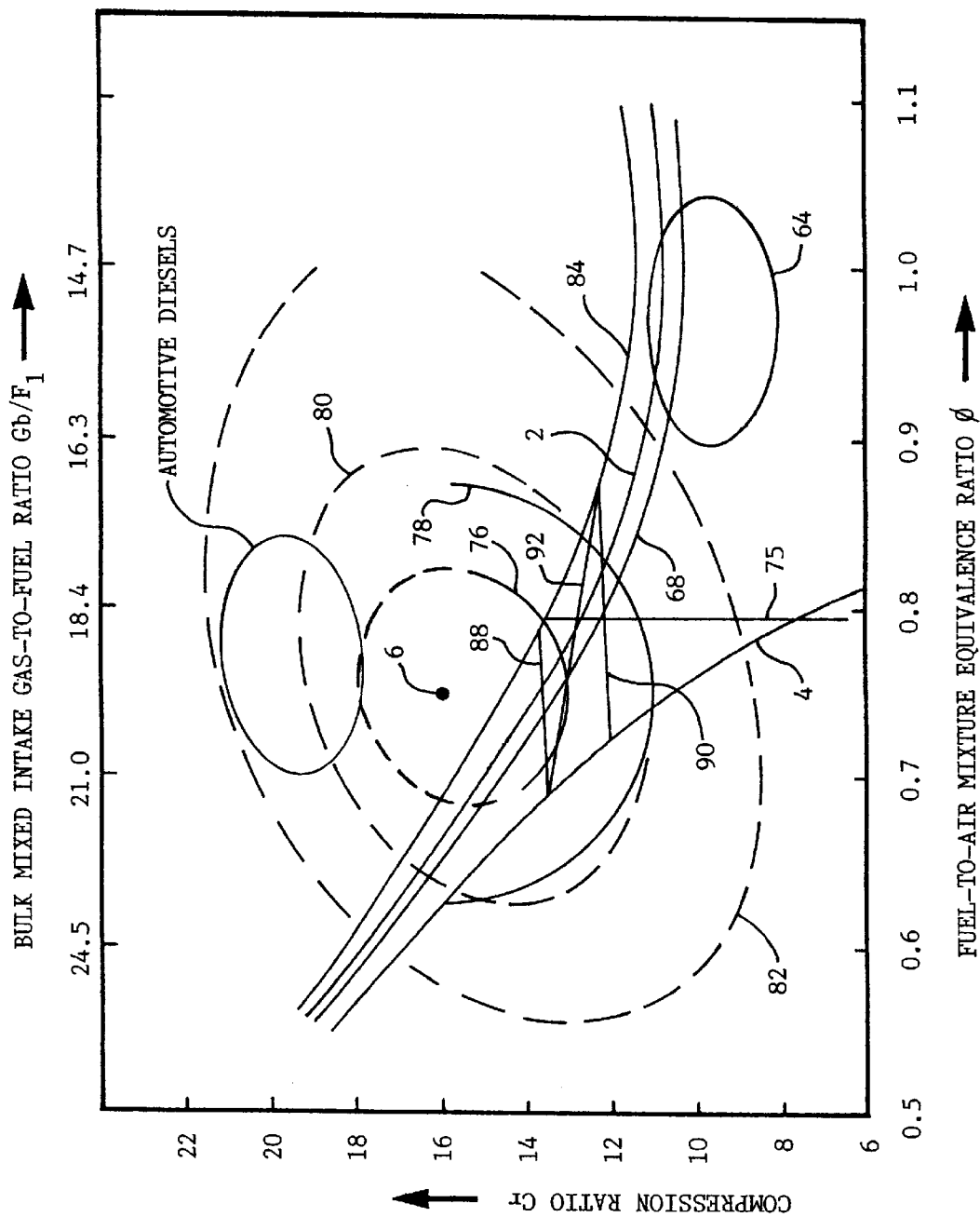
FIG. 4 is similar to FIG. 1 but shows efficiency contours and a part-load compression detonation limit line.

FIG. 4 is similar to FIGS. 1 and 3, but shows constant efficiency contour lines 76, 78, 80, and 82, where best efficiency is attained within contour 76 and a lower efficiency is attained along contour 82. The actual location of these contour lines will vary from engine to engine, however, the contour lines shown in FIG. 4 approximately indicate the general relationship between engine efficiency, compression ratio, equivalence ratio, and knock limits for typical automotive spark-ignition internal-combustion engines. As described earlier, compression ratio and equivalence ratio settings shown above the knock limit and below and to the left of the lean flammability limit are not practical for use.

FIG. 4 illustrates that best efficiency for a given power demand is attained by using the highest compression ratio available that is below the knock limit for engine settings located nearest to point 6. According to the present invention, efficiency is improved by adjusting the compression ratio and equivalence ratio so that engine 8 operates at point settings located on line 2. In some embodiments of the present invention it is not practical or energy efficient to continuously adjust and fine tune the compression ratio of the engine. Consequently, in some embodiments of the present invention engine 8 operates at point settings located between lines 2 and 68. For example the first and second settings described above may fall between lines 2 and 68.

According to the present invention, during light load operation of engine 8, less air $m_a$ enters the combustion chamber(s) of engine 8 due to throttling. Valve adjustment mechanism 48 may be used in stead of or in combination with throttle 46 to adjust air mass ma flow into engine 8. The knock limit line 2 of engine 8 is higher during light load engine operation due to the reduced mass and/or temperature of the air ma admitted into the combustion chamber(s) of the engine. Line 84 indicates the light load knock limit of spark-ignition engines according to the present invention at a part load throttle setting. More specifically, line 84 indicates the position of line 2 during operation of engine 8 at part load and with a reduced air mass ma flow rate into engine 8. The location of line 2 will vary with engine throttle position (e.g., with intake air mass $m_a$ flow rate and temperature), and line 84 is intended to indicate one of the positions of line 2. At wide-open-throttle, line 84 will be superimposed over the position of line 2 shown in FIGS. 1, 3, and 4. While the knock limit indicated by line 84 is higher when the engine is throttled, it is important to note that the efficiency of the engine (indicated by point 6, and lines 76, 80, and 82) is lower due to pumping losses associated with throttling. Considering the higher knock limit of the engine at light load indicated by line 84, best engine efficiency of the throttled engine can be attained by increasing the compression ratio at light load. Specifically, best efficiency of the throttled engine is attained by adjusting the compression ratio so that the engine settings traverses line 84, where the location of line 84 varies with throttle position (e.g., with intake air mass ma flow rate and temperature). The compression ratio and equivalence ratio settings of the engine thus fall along line 84, and more specifically in an area located above the position of line 2 shown in FIG. 4 and below the highest position of line 84 at a given equivalence ratio value, it being understood that the location of line 84 at each equivalence ratio value varies with throttle position. It may not be practical or energy efficient to continuously adjust and fine tune the compression ratio of the engine. Consequently, in some embodiments of the present invention engine 8 is adjusted so that the compression ratio and equivalence ratio settings of the engine fall between the highest position of line 84 and the position of line 2 shown in FIG. 4 or between the highest position of line 84 and line 68, where the compression ratio between these bounds is adjusted less frequently, or only when the power demand of the engine causes the engine to knock (e.g., the engine setting falls above line 84), or if knock is imminent (e.g., controller 54 predicts that the engine setting will fall above line 84 unless one or more counter measures are taken, such as lowering the compression ratio, reducing the equivalence ratio, adjusting the spark timing, or another affective counter measure for avoiding engine knock.) Accordingly, the first setting and second settings of the engine referred to above may fall between line 84 and the position of line 2 shown in FIG. 4 or between lines 84 and 68. According to the present invention, controller 54 adjusts the compression ratio and equivalence ratio ø to prevent engine 8 from knocking or from misfiring due to excessively high compression ratio or due to overly lean conditions respectively. Referring now to FIGS. 1, 2, and 4, controller 54 adjusts the compression ratio and equivalence ratio to provide optimum engine efficiency, while providing engine settings that fall below the knock limit of the engine and that fall above line 2 or 68. Alternatively, the controller adjusts the engine settings less frequently, and more specifically only when the engine settings approach or fall above or below the desired operational bounds (e.g., lines 2, 68, or 84). In another embodiment of the present invention, controller 54 adjusts the compression ratio to provide engine settings that fall below the knock limit of the engine and that fall above and to the left of the lean flammability limit, indicated by line 4. According to the present invention, air mass ma flow rate may be controlled by adjustable valve mechanism 48 in addition to, or as an alternative to, throttle 46.

Referring now to FIGS. 1, 2, and 4, according to the present invention, controller 54 may include an optimizer that systematically adjusts the engine's compression ratio, equivalence ratio, and/or other engine settings to cause the engine's compression ratio and equivalence ratio settings to migrate generally from the lower right of the chart shown in FIG. 4 towards the maximum efficiency point of engine 8 located near point 6, while maintaining the location of the engine's settings in the area located between the knock limit of the engine and the lean flammability limit of the engine. The optimizer can predict the final, or near final, setting between the knock limit of the engine and the lean flammability limit of the engine, and adjust the compression ratio and equivalence ratio settings in one or more large steps to traverse directly from the present setting to the final predicted setting. Alternatively, the optimizer can execute a series of small compression ratio and equivalence ratio adjustments, that systematically move the compression ratio and equivalence ratio setting closer to the maximum efficiency point of the engine that lies between the knock limit of the engine and the lean flammability limit of the engine. According to the present invention, engine sensors, such as knock sensor 52 and misfire sensor 50, provide signals to controller 54 enabling controller 54 to determine if and when the compression ratio and equivalence ratio setting has crossed, or is too close to, the knock limit of the engine or the lean flammability limit of the engine. In the event that the compression ratio and equivalence ratio setting has crossed, or is about to cross, the knock limit or lean flammability limit of the engine, as detected by one or more engine sensors such as the knock sensor and/or lean flammability sensor, controller 54 adjusts the compression ratio, equivalence ratio, and/or other engine settings to prevent and/or avoid detrimental engine knock or engine misfire and to improve engine efficiency.

Zone 1, 3, and 5 described above are bound by line 2. Line 84 shows one of the positions of line 2, as described above.

Referring now to FIGS. 1 and 2, the amount of air $m_a$ admitted into cylinder 12 may be controlled by throttle 46 and/or valve adjustment mechanism 48. According to the present invention, compression ratio Cr is increased when the amount of air $m_a$ admitted into cylinder 12 is decreased in order to provide a higher maximum combustion charge density $\rho$ within cylinder 12. The maximum combustion charge density is the density of the combustion charge when piston 10 is at top-dead-center within cylinder 12. Engine 8 has a brake mean effective pressure, bmep, where bmep is defined on page 45 of *Internal Combustion Engines and Air Pollution*, Edward F. Obert, Harper & Row Publishers, 1973 (SI units for bmep are shown on page 50 of *Internal Combustion Engine Fundamentals*, John B. Heywood, MIT Press, 1988). bmep values greater than 750 kilo-pascals (kPa) generally fall within Zone 1, and bmep values less than 750 kPa generally fall within Zone 3. According to the present invention, engine 8 has a first setting having a first bmep value greater than 750 kPa, and a first maximum combustion charge density $\rho_1$. and engine 8 has a second engine setting having a second bmep value less than 750 kPa, and a second maximum combustion charge density $\rho_2$ that is greater than the first maximum combustion charge density $\rho_1$. Preferably, $\rho_2$ is more than 1.15 times larger than $\rho_1$. More specifically, according to the present invention, $\rho_2$ has a value greater than 9.0 kilograms per cubic meter ($kg/m^3$) at a bmep value less than 750 kPa in order to provide a high engine efficiency. Preferably $\rho_2$ has a value greater than 9.5 $kg/m^3$ at a bmep value less than 750 kPa, however that specification may not be practical in some engines due to engine knock. According to the present invention, fuel efficiency is improved by increasing the compression ratio Cr from a first ratio to a second ratio to provide a second maximum combustion charge density $\rho_2$ greater than the first maximum combustion charge density $\rho_1$, and reducing the fuel-to-air mixture equivalence ratio ø from a first ratio to a second ratio to provide a brake mean effective pressure bmep less than 750 kPa, whereby increasing the compression ratio Cr from the first ratio to the second ratio provides high efficiency and robust combustion, and reducing the fuel-to-air mixture equivalence ratio ø from the first ratio to the second ratio prevents detrimental engine knock and increases engine efficiency.

As an alternative to engine throttling, or in combination with throttling, valve adjustment mechanism 48 can adjust the amount of air admitted into cylinder 12 through valve 14. Controlling engine power by valve adjustment mechanism 48 results in significantly lower pumping losses than that present in engines where power is controlled only by throttling. Adjustable valve control can also be employed to generate swirl within the engine's cylinder(s). Valve timing can be fixed, to attain an Atkinson thermodynamic cycle or a Miller thermodynamic cycle, or variable to provide, for example an Otto thermodynamic cycle and an Atkinson thermodynamic cycle and/or a Miller thermodynamic cycle at different times of engine operation. Adjustable intake valve timing can be used with or without throttling. The present invention may include adjustable valve control to attain high efficiency by the methods described generally above.

Dashed line 86 (shown in FIG. 3) indicates the location of line 4 for a high swirl engine where the lean mixture limit of an engine is shifted to the left. Specifically, dashed line 86 indicates the lean mixture limit of an engine having an above average amount of swirl, tumble, and/or squish in the combustion chamber, which generates turbulent mixing in the combustion chamber and promotes stable burning of the combustion charge. While high swirl levels in the combustion chamber enables very lean fuel-to-air mixture ratios to be burned, the turbulence increases heat transfer from the combustion chamber which off-sets to some degree the fuel efficiency benefit of employing a lean fuel-to-air mixture ratio. According to the present invention, engine 8 preferably has a swirl ratio less than 1.4 at an engine speed greater than 1400 rotations per minute (rpm) in order to minimize heat loss from the combustion charge to the engine. Specifically, according to the present invention a high compression ratio setting is used to promote rapid and complete combustion of lean fuel/air mixtures, instead of high swirl levels.

According to the present invention, valve overlap is minimized to minimize the size of the valve pockets in the piston, and to minimize combustion chamber surface area and heat loss. According to the present invention, high efficiency is achieved with a valve overlap of less than 25° at maximum compression ratio, where valve overlap is defined as the crankshaft rotational period in degrees where at least one intake valve and at least one exhaust valve are open at the same time in the same cylinder (e.g., when the piston is near top dead center). Intake valve opening is measured from the 0.15 mm valve-lift point, and exhaust valve closing is measured from the 0.15 mm valve-lift point. Preferably, according to the present invention, at least one intake valve in cylinder 12 opens before the piston 10 reaches top dead center (TDC). According to the present invention, valve overlap is minimized at high compression ratio levels. The reduced valve overlap at high compression ratio levels enables the size and surface area of the valve pockets 49 in the piston to be minimized (or eliminated), causing heat loss from the combustion charge to be reduced, providing higher engine efficiency. The engine according to the present invention preferably includes adjustable valve control. According to the present invention, the adjustable valve control provides a smaller valve overlap at high compression ratio levels than at lower compression ratio levels, in order to minimize the size of the valve pockets in the piston, and improve engine efficiency. According to the present invention, at lower compression ratio values, the valve overlap period is increased to increase engine power. At maximum power, the valve overlap period is preferably greater than 25° in order to provide sufficient air flow into engine 8. According to the present invention, the valve overlap period is adjusted by at least 5°, and preferably by more than 10°. More specifically, the second valve overlap period is at least 5° shorter than the first valve overlap period.

Referring now to FIGS. 1 and 2, the engine may be supercharged to provide greater power, and greater efficiency. Zone 6 has a low compression ratio to enable supercharging for increased maximum engine power output without detrimental knock.

Referring now to FIG. 4, the engine according to the present invention may operate between lines 84 and 2, and to the left of point 6. This area of operation provides very low engine-out NOx emission levels due to the relatively low temperature of the burning fuel-to-air mixture.

Referring now to FIGS. 1, 2, 3, and 4, for an equivalence ratio less than 1.0, the excess air can be substituted with exhaust gas, yielding an air-to-fuel mixture ratio in the combustion chamber that will release the same (or almost the same) amount of energy during combustion, but that will have no or almost no free oxygen in the combustion byproducts. The advantage of substituting the excess air with exhaust gas or EGR is that catalytic converter 34 is significantly more effective at reducing oxides of nitrogen emissions (NOx) when there is no, or almost no, free oxygen in the exhaust stream.

Additionally, engine out NOx emissions are reduced by increasing EGR levels. According to the present invention, the top horizontal axis of FIGS. 1, 3, and 4 indicate both scenarios where there is no substitution of air with exhaust gas, and scenarios where there is some substitution of air with exhaust gas. In greater detail, the top horizontal axis indicates the bulk mixed intake gas $G_b$ to fuel $F_1$ ratio for gasoline fueled engines according to the present invention, where, $$G_b/F_1 = (G_1 + G_2)/F_1$$

$G_b$ is the total mass of gas trapped in cylinder(s) 12, excluding unburned fuel, and $G_1$ is the mass of air $m_{as}$ that provides a stoichiometric mixture with the mass of fuel $F_1$, where, $$(G_1/F_1)(F/A)_s = (m_{as}/F_1)(F/A)_s = 1$$

for conditions where, $$Gb/F_1 \geq 14.7 \pm 0.2$$

The top horizontal axis indicates the ratio $G_b/F_1$ for gasoline fueled engines, where gasoline has a stoichiometric air-to-fuel mixture mass ratio of about 14.7 to 1, where, $$m_{as}/F_1 \cong 14.7$$

Those skilled in the art will appreciate that the present invention can be operated on gasoline as well as other fuels suitable for spark ignition engines. $G_2$ is the mass of a second gas admitted into cylinder(s) 44. $G_2$ may be air and have a mass greater than zero, in which case the bulk mixed intake gas to fuel ratio $G_b/F_1$ is fuel lean and the equivalence ratio ø shown on the lower horizontal axis is less than 1. Preferably in fuel lean engines according to the present invention, the ratio of air-to-fuel is either greater than 17.3 in order to minimize NOx formation in the combustion chamber, or near-stoichiometric, in order to permit effective operation of catalytic converter 34, where near-stoichiometric is defined as an air-to-fuel mass ratio of 14.7±0.2 for most commercially available blends of gasoline, and more generally the mass ratio of ambient air to fuel ±0.2 where there is just enough air to burn all of the fuel. According to the present invention, second gas $G_2$ may be burned gas $m_b$, where, $$G_b/F_1 = (m_{as} + m_b)/F_1$$

where there is just enough air present to burn all of the fuel. Burned gas $m_b$ is the mass of burned gas trapped in the cylinder(s). Burned gas $m_b$ may include residual exhaust gas trapped in the cylinder(s) from the previous combustion cycle, $m_r$, and burned gas $m_b$ may include recirculated exhaust gas $m_{egr}$, where, $$m_b = m_r + m_{egr}$$

More specifically, $m_{egr}$ is the mass of the burned exhaust gas recycled to cylinder 12 through valve 14 and through EGR feed line 36 or drawn back into cylinder 12 through valve 28 (depending largely on exhaust and intake valve overlap timing). As a minor detail, a small amount of unburned air $m_a$ may be mixed into burned gas $m_b$ due to incomplete combustion of the previous combustion cycle. Additionally, engine 8 according to the present invention can be operated with excess air with burned gas $m_b$, where, $$G_1 = m_{as}$$

and $$G_2 = m_{a2} + m_b$$

Referring now to FIG. 1, Zones 1, 2, 3, 4, 5, and 6 may be defined in terms of bulk mixed intake gas $G_b$ to fuel $F_1$ ratio $G_b/F_1$ instead of, or in addition to equivalence ratio ø. Specifically, Zones 1 has a $G_b/F_1$ ratio less than 17.3 and a compression ratio less than the knock limit indicated by line 2.

Zones 2 has a $G_b/F_1$ ratio less than 17.3 and a compression ratio less than 12.5.

Zone 3 is alternatively defined as having a compression ratio greater than 12.5 and less than the knock limit indicated by line 2, and a $G_b/F_1$ ratio less than 23.5, and in any event less than the lean mixture limit indicated by line 4.

Zone 4 has a $G_b/F_1$ ratio greater than 17.3, and a compression ratio greater than 13.

Zone 5 is alternatively defined as having a compression ratio greater than 13 and less than the knock limit indicated by line 2, and a $G_b/F1$ ratio less than 21.8, and in any event less than the lean mixture limit indicated by line 4.

Zone 6 has a $G_b/F_1$ ratio less than 16.3 and a compression ratio less than 9.

Line 75 shown in FIGS. 1 and 4 indicates a $G_b/F_1$ ratio of 18.5. Preferably engine 8 is operated to the left of line 75, and at $G_b/F_1$ ratios larger than 18.5, most of the time in order to attain a high efficiency according to the present invention, however that specification may not be practical in some engines due to knock.

Preferably, the bulk mixed gas to fuel mixture includes a stoichiometric fuel-to-air mixture ratio $(F/A)_s$ component and a burned gas component, $m_b$, and no excess air, so that there are stoichiometric exhaust gas combustion products, and specifically no, or almost no, oxygen or unburned fuel in the exhaust, in order to provide optimum performance of catalytic converter 34 and minimum tailpipe exhaust gas emission levels.

As stated previously, preferably $\rho_2$ is more than 1.15 times larger than $\rho_1$. According to the present invention, the variable compression ratio provides a second maximum combustion charge density that is greater than the first maximum combustion charge density, and the adjustable valve overlap and the adjustable bulk mixed gas to fuel ratio reduces the first brake mean effective pressure from a value greater than 750 kilo-pascals to a second value less than 750 kilo-pascals. Preferably, according to the present invention, the variable compression ratio provides a second compression ratio greater than 13, and the adjustable bulk mixed gas to fuel ratio provides a second bulk mixed gas to fuel ratio of at least 17.3 (and preferably greater than 18.5) having an air-to-fuel ratio of 14.7±0.2.

Optimum efficiency is achieved in the range of compression ratios, equivalence ratios, and bulk mixed intake gas ratios shown within Zones 3 and 5 for most engines according to the present invention. The present invention can attain, or almost attain, the efficiency of diesel engines used in passenger cars, while also attaining about 90% lower NOx and particulate mater (PM) air pollution levels than the diesel engine. Specifically, the present invention, employed in a passenger car having a curb weight of less than 6500 pounds, can attain a peak brake thermal efficiency of over 38%, NOx emission levels below 0.05 grams per mile (current passenger car diesel engines have NOx emissions slightly lower than 1.00 grams per mile), and PM emissions lower than 0.01 grams per mile, where emission levels are measured according to California State Low Emission Vehicle II (LEV II) regulatory procedures, which were passed by a vote of the California Air Resources Board on Nov. 5, 1998. The definition of brake thermal efficiency is provided on page 9 of *The Internal-Combustion Engine in Theory and Practice*, Volume 1, Charles Fayette Taylor, The M.I.T. Press, 1985.

Referring now to FIGS. 1 and 4, according to the present invention, engine 8 may operate at a fixed elevated compression ratio setting, indicated by line 88, and have a variable equivalence ratio ø or variable bulk mixed intake gas ratio $G_b/F_1$. Specifically, the power output of engine 8 can be rapidly adjusted by adjusting the equivalence ratio ø or bulk mixed intake gas ratio $G_b/F_1$, while holding compression ratio fixed. Equivalence ratio ø and bulk mixed intake gas ratio $G_b/F_1$ can generally be adjusted faster than the compression ratio can be adjusted. Accordingly, compression ratio can be set to a value greater than 11, indicated by line 90, or greater than 13, indicated by line 88, and equivalence ratio ø or bulk mixed intake gas ratio $G_b/F_1$ adjusted between the knock limit line 84 and the lean flammability limit line 4. Line 92 is intended to indicate engine a sequence of settings used between line 88 and line 90 according to the present invention. Specifically, controller 54 may adjust compression ratio less rapidly than equivalence ratio ø or bulk mixed intake gas ratio $G_b/F_1$ in order to provide a fast response and to minimize adjustment of the compression ratio, and in particular to minimize power consumed by variable compression ratio mechanism 30 during adjustment of the compression ratio.

Referring now to FIGS. 2 and 4, according to the present invention, exhaust gas drawn from exhaust line 32 into EGR feed line 36 may be cooled by exhaust gas cooler 42 and the condensed water drained off through a drain 44 or other drainage means, providing a reduced water content in recirculated exhaust gas $m_{egr}$. Reducing the water content in recirculated exhaust gas $m_{egr}$ provides a faster combustion burn rate, resulting in improved fuel efficiency.

Engines according to the present invention can be operated on a broad range of fuels, and can be self adjusting to various fuel octane ratings. Lines 2 and 84 generally indicates the knock limit of the engines operating on regular and premium gasoline. Those skilled in the art will appreciate that some production engines that operate on regular fuel have a higher compression ratio than some engines that operate on premium fuel.

Those skilled in the art will recognize that the invention can be practiced with modifications within the spirit and scope of the claims.

What is claimed is:

1. A method of improving the fuel economy and reducing the tailpipe emissions of spark-ignition internal-combustion engines having a displacement volume, a combustion chamber volume, means for adjusting the compression ratio comprising an adjustment mechanism to vary the combustion chamber volume, an intake and exhaust valve overlap period, and a fuel to air equivalence ratio, a first engine setting having a first compression ratio position, a first valve overlap period, and a first fuel to air equivalence ratio, wherein the engine has an adjustable fuel to air equivalence ratio, and the first compression ratio position is below the knock limit of the engine at the first engine setting, having the steps of, increasing the compression ratio from the first position to a second position, and reducing the fuel to air equivalence ratio from the first ratio to a second ratio, whereby increasing the compression ratio from the first ratio to the second ratio, and reducing the to fuel to air equivalence ratio from the first ratio to the second ratio prevents detrimental engine knock and increases engine efficiency.

2. The method of claim 1 further including the step of reducing the valve overlap period from the first period to a second period.

3. The method of claim 2 wherein the second valve overlap period is less than 25°.

4. The method of claim 2 wherein the first valve overlap period is greater than 25°.

5. The method of claim 1 wherein the variable compression ratio provides a second compression ratio greater than 13, and the adjustable fuel to air equivalence ratio provides a second fuel to air equivalence ratio within a radius of 0.125 index units from a compression ratio of 16.0 and a fuel to air equivalence ratio of 0.75.

6. The method of claim 1 wherein the variable compression ratio provides a second compression ratio greater than 13, and the adjustable fuel to air equivalence ratio provides a second fuel to air equivalence ratio less than 0.85.

7. The method of claim 1 wherein the variable compression ratio provides a first compression ratio less than 12.5, and provides a second compression ratio greater than 13, wherein the engine has an efficiency greater than 38% at the second engine setting.

8. The method of claim 1 wherein the variable compression ratio provides a second maximum combustion charge density greater than the first combustion charge density, and the adjustable fuel to air equivalence ratio reduces the first brake mean effective pressure from a value greater than 750 kilo-pascals to a second value less than 750 kilo-pascals.

9. The method of claim 8 wherein the variable compression ratio provides a second maximum combustion charge density that is at least 1.15 times greater than the first maximum combustion charge density.

10. The method of claim 1 wherein the variable compression ratio provides a second compression ratio greater than 13, and the adjustable fuel to air equivalence ratio provides a second fuel to air equivalence ratio within a radius of 0.075 index units from a compression ratio of 16.0 and a fuel to air equivalence ratio of 0.75.

11. In an internal-combustion engine having at least one piston, a displacement volume, a combustion chamber volume, means for adjusting the compression ratio comprising an adjustment mechanism to vary the combustion chamber volume, an intake and exhaust valve overlap period, a bulk mixed gas to fuel ratio having an air-to-fuel ratio, means for adjusting the bulk mixed gas to fuel ratio, and a first engine setting having a first bulk mixed gas to fuel ratio and a first compression ratio, a method of operating the engine at an elevated compression ratio and at an elevated bulk mixed gas to fuel ratio, to improve the fuel efficiency of the engine while avoiding detonation and misfire, comprising the steps of:

increasing the compression ratio above the knock limit of the first engine setting to extend the stable combustion limit, and increasing the bulk mixed gas to fuel ratio to extend the knock limit, and prevent engine knock.

12. The method of claim 11 wherein the step of increasing the compression ratio above the knock limit and the step of increasing the bulk mixed gas to fuel ratio are performed concurrently to prevent engine knock and misfire.

13. The method of claim 11 wherein the compression ratio is increased from a first setting having a compression ratio value less than 12.5 to a second setting having a compression ratio value greater than 13.

14. The method of claim 13 wherein the bulk mixed gas to fuel ratio is increased from a first value less than 17.3 to a second value greater than 17.3.

15. The method of claim 14 wherein the second bulk mixed gas to fuel ratio is greater than 18.5.

16. The method of claim 13 wherein the second setting has a combustion charge density of at least 9.0 kilograms per cubic meter.

17. The method of claim 16 wherein the second setting has a brake mean effective pressure less than 750 kilo pascals.

18. The method of claim 11 wherein the air-to-fuel ratio is held fixed approximately at a stoichiometric value to permit effective catalytic reduction of emissions, and the exhaust gas residual fraction is varied.

19. The method of claim 11 further including the step of applying external exhaust gas recirculation to increase the bulk mixed gas to fuel ratio.

20. The method of claim 11 further including the step of increasing the air-to-fuel ratio to increase the bulk mixed gas to fuel ratio.

21. The method of claim 11 further including the step of reducing the valve overlap period to reduce the clearance between the valves and the piston to provide and improved combustion chamber geometry.

22. The method of claim 11 further including the step of reducing the valve overlap period from a value greater than 25 crankshaft rotational degrees to a value less than crankshaft rotational 25 degrees, to reduce the clearance between the valves and the piston to provide and improved combustion chamber geometry.

23. The method of claim 22 further including the step of increasing the exhaust gas residual fraction present in the bulk mixed gas to fuel ratio.

24. The method of claim 11 further including the step of reducing the valve overlap period from the first valve overlap setting to a second valve overlap setting at least 5 crankshaft rotational degrees less than the first valve overlap setting.

25. The method of claim 11 wherein the engine has a peak brake thermal efficiency greater than 38%.

26. The method of claim 11 wherein the engine has a swirl ratio at the second engine setting of less than 1.4 at an engine speed greater than 1400 rotations per minute, wherein the low swirl rate provides low heat loss from the combustion charge.

27. A method of rapidly adjusting the power output of spark-ignition internal-combustion engines having a displacement volume, a combustion chamber volume, means for adjusting the compression ratio comprising an adjustment mechanism to vary the combustion chamber volume, and a bulk mixed gas to fuel ratio having a first setting, including the steps of, Increasing the compression ratio to a value greater than 13 to provide an extended lean flammability limit, adjusting the bulk mixed gas to fuel ratio from the first setting to a second setting to adjust engine power output, and maintaining the compression ratio at a value greater than 13, wherein increasing the compression ratio to a value greater than 13 increases the lean flammability limit, adjusting the bulk mixed gas to fuel ratio varies engine power, and maintaining the compression ratio at a value greater than 13 reduces power consumed by the variable compression ratio mechanism during adjustment of compression ratio.

28. The method of rapidly adjusting the power of spark-ignition internal combustion engines of claim 27, further including the step of adjusting the fuel to air equivalence ratio.

29. The method of rapidly adjusting the power of spark-ignition internal combustion engines of claim 27, wherein the fuel is injected directly into the combustion chamber volume.

30. The method of rapidly adjusting the power of spark-ignition internal combustion engines of claim 27, further including the steps of, adjusting the exhaust gas residual fraction, and maintaining approximately a stoichiometric fuel to air equivalence ratio, wherein the stoichiometric fuel to air equivalence ratio enables optimum catalytic reduction of exhaust emissions.

31. The method of rapidly adjusting the power of spark-ignition internal combustion engines of claim 27, further including the steps of, adjusting the exhaust gas residual fraction, and adjusting the fuel to air equivalence ratio, wherein adjusting the exhaust gas residual fraction and adjusting the fuel to air equivalence ratio provides high engine efficiency and stable combustion over a large range of power.

32. A high-efficiency low-emission vehicle having a curb weight less than 6500 pounds comprising:

a body; and a reciprocating piston four-stroke spark-ignition internal combustion engine connected to said body to provide power for moving the vehicle, said engine having a displacement volume, a combustion chamber volume, means for adjusting the compression ratio comprising an adjustment mechanism to vary the combustion chamber volume, an intake and exhaust valve overlap period, and a bulk mixed gas to fuel ratio having an air-to-fuel ratio, said vehicle having a California State Low Emission Vehicle II oxides of nitrogen emission test value, wherein the engine has means for adjusting the bulk mixed gas to fuel ratio, and a first engine setting having a compression ratio less than 12.5, and a second engine setting, having a compression ratio greater than 13, and the bulk mixed gas to fuel ratio at the second engine setting is greater than the bulk mixed gas to fuel ratio at the first engine setting, wherein the vehicle has a California State Low Emission Vehicle II oxides of nitrogen emission test value less than 0.05 grams per mile.

33. The high-efficiency low-emission vehicle of claim 32, wherein the second engine setting has a fuel to air equivalence ratio less than 0.85.

34. The high efficiency low-emission vehicle of claim 32, wherein the second engine setting has a bulk mixed gas to fuel ratio greater than 18.5.

35. The high-efficiency low-emission vehicle of claim 32 further including means for supercharging.

* * * * *